(12) United States Patent
Franke et al.

(10) Patent No.: US 9,966,754 B2
(45) Date of Patent: May 8, 2018

(54) CIRCUIT BREAKER

(71) Applicant: Siemens Aktiengesellschaft, Munich (DE)

(72) Inventors: Henry Franke, Berlin (DE); Wolfgang Fruth, Amberg (DE); Stefan Haebel, Oberasbach (DE); Rainer Huentemeier, Nuremberg (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 163 days.

(21) Appl. No.: 15/145,047

(22) Filed: May 3, 2016

(65) Prior Publication Data

US 2016/0329696 A1    Nov. 10, 2016

(30) Foreign Application Priority Data

May 5, 2015    (DE) .................. 10 2015 208 274
Feb. 24, 2016  (DE) .................. 10 2016 202 827

(51) Int. Cl.
| | |
|---|---|
| *H02H 3/00* | (2006.01) |
| *H02H 3/027* | (2006.01) |
| *H01H 71/12* | (2006.01) |

(52) U.S. Cl.
CPC .......... *H02H 3/027* (2013.01); *H01H 71/125* (2013.01)

(58) Field of Classification Search
CPC .................................................. H02H 3/027
See application file for complete search history.

(56) References Cited

U.S. PATENT DOCUMENTS 4,420,789 A * 12/1983 Breen ................... H02H 3/027
                                                  327/31
4,827,369 A *  5/1989 Saletta ................... H02H 3/04
                                                  361/93.2

(Continued)

FOREIGN PATENT DOCUMENTS

| CN | 1639939 A | 7/2005 |
| CN | 1805235 A | 7/2006 |
| CN | 104242256 A | 12/2014 |

OTHER PUBLICATIONS

German Office Action dated Aug. 4, 2016.
Chinese Office Action and English translation thereof dated Feb. 8, 2018.

*Primary Examiner* — Stephen W Jackson
(74) *Attorney, Agent, or Firm* — Harness, Dickey & Pierce, P.L.C.

(57) ABSTRACT

A circuit breaker is disclosed for an electrical circuit. The circuit breaker includes a tripping unit; at least one current sensor; and an input for a signal, at which a blocking signal for a circuit breaker arranged upstream on the energy sink side, can be received. The tripping unit; at least one current sensor; and an input are all connected to a control unit. A connectable blocking function is provided. The ascertained current is compared with a first current limit value, the exceeding of which requires this first current value to be present for a first period of time in order to prompt interruption of the electrical circuit; and is compared with a second current limit value. Different periods of time need to be present to prompt interruption when the blocking function is disengaged or engaged.

17 Claims, 2 Drawing Sheets

(56) References Cited

U.S. PATENT DOCUMENTS

| | | | | |
|---|---|---|---|---|
| 5,774,319 | A | * | 6/1998 | Carter .................... H02H 1/06 361/100 |
| 6,807,037 | B1 | * | 10/2004 | Patruno ................ G01R 31/025 361/42 |
| 2004/0078463 | A1 | | 4/2004 | Pearlman et al. |
| 2008/0198521 | A1 | | 8/2008 | Weiher et al. |
| 2009/0257157 | A1 | | 10/2009 | Vicente et al. |
| 2012/0181152 | A1 | | 7/2012 | Carlino |
| 2014/0118875 | A1 | | 5/2014 | Carlino et al. |

* cited by examiner

CIRCUIT BREAKER

PRIORITY STATEMENT

The present application hereby claims priority under 35 U.S.C. § 119 to German patent application numbers DE 102015208274.1 filed May 5, 2015 and DE 102016202827.8 filed Feb. 24, 2016, the entire contents of each of which are hereby incorporated herein by reference.

FIELD

At least one embodiment of the invention generally relates to a circuit breaker.

At least one embodiment of the present invention generally relates to circuit breakers, such as compact circuit breakers, or molded case circuit breakers, open circuit breakers, or air circuit breakers, or circuit breakers of this kind.

BACKGROUND

Circuit breakers are special switches or protective gear and/or switchgear that is/are designed such that it/they can, under many fault conditions, such as ground fault, phase opposition, overload and short circuit, for example, in an electrical network, such as e.g. a low voltage network, switch on and off, hold and safely disconnect load currents, high overload currents and short-circuit currents. Such switchgear is used as incoming-feeder, distribution, tie and outgoing-feeder circuit-breakers in electrical systems. Such switches are also used for the switching and protection of motors, capacitors, generators, transformers, bus bars and cables.

Circuit breakers can be used particularly in low voltage networks, i.e. networks having voltages or rated voltages of up to 1000 volts AC or 1500 volts DC. These circuit breakers have sensor units, such as current sensors, that measure the electric current flowing through the switch.

Particularly in the low voltage range, circuit breakers are used for current intensities or rated current ranges from 16 to 6300 amps, particularly in the range from 16 to 1600 amps, more specifically in the range from 63 or 125 to 1600 amps, for example as a compact circuit breaker, and also from 630 to 6300 amps, more specifically from 1200 to 6300 amps, for example as an open or air circuit breaker.

Usually, circuit breakers have a tripping unit to interrupt the electrical circuit, said tripping unit being provided with contacts, for example, that open or close the electrical circuit. In addition, a circuit breaker has a control unit that may be implemented centrally or locally. When current limit values and/or current/time period limit values, which are defined by a characteristic curve, for example, are exceeded, the circuit breaker interrupts the electrical circuit.

In this case, a first current limit value Ii, which needs to be exceeded for a first, only short, period of time t1 for interruption purposes, is the current value for what is known as instantaneous protection or short-circuit protection, for example. Instantaneous means interruption with the minimum possible or a set short tripping time for the circuit breaker.

A second, for example adjustable, current limit value Isd for the circuit breaker, which needs to be present for a second period of time t2 for interruption purposes, is the current limit value for what is known as short-term-delayed interruption or tripping, for example. This second current limit value Isd defines the level of the current from which short-term-delayed interruption begins. In this case, the current needs to be there for the second period of time t2 before interruption takes place. The short-term-delayed interruption or tripping can have an adjustable second period of time t2 or delay.

When the current rises above the second current limit value Isd, the second period of time t2 can decrease with increasing current in order to prompt interruption.

When the current rises above the second current limit value Isd for a time greater than the set delay, for example, interruption takes place after the second period of time t2.

When the current rises above the second current limit value Isd, it is possible, given a current-dependent characteristic of the short-term-delayed tripping, for the second period of time t2 to decrease with increasing current in order to prompt interruption.

When the first current limit value Ii is reached, instantaneous interruption of the electrical circuit frequently takes place.

Circuit breakers are used for distributing electric power. When a fault occurs in the power distribution system, the circuit breaker arranged immediately upstream of the fault is intended to recognize the fault current, to trip and to disconnect the current. This is referred to as selectivity or selective tripping.

When multiple circuit breakers are connected in series, for example between energy source and energy sink, or current source and load, all circuit breakers situated in the path frequently recognize an overload or short circuit. Disconnection by the circuit breaker closest to the fault under many conditions is desirable.

SUMMARY

At least one embodiment of the present invention is directed to a circuit breaker.

At least one embodiment of the invention is directed to a circuit breaker for an electrical circuit, comprising:
  a tripping unit, to interrupt the electrical circuit;
  at least one current sensor, to ascertain the electric current I flowing through the circuit breaker;
  an input for a ZSI signal, at which a blocking signal for a circuit breaker arranged upstream on the energy sink side can be received, all of which are connected to a control unit and are embodied such that a connectable blocking function ZSI is provided, wherein the ascertained current I
  a) is compared with a first current limit value Ii, the exceeding of which requires this first current value to be present for a first period of time t1 in order to prompt interruption of the electrical circuit,
  b) is compared with a second current limit value Isd, which is below the first current limit value Ii—i.e. smaller,
    when the blocking function ZSI is disengaged, this second current limit value Isd needs to be present for a second period of time t2, which exceeds the first period of time, in order to prompt interruption,
    when the blocking function ZSI is engaged and the blocking signal is absent, this second current limit value Isd needs to be present for a third period of time t3 in order to prompt interruption,
    when the blocking function ZSI is engaged and the blocking signal is there, this second current limit value Isd needs to be present for a fourth period of time t4, which exceeds the third period of time, in order to prompt interruption,
wherein when the blocking function is engaged and the blocking signal is there, exceeding of the first current limit value Ii requires said first current limit value to be present for a fifth period of time t5, which exceeds the first period of time, in order to prompt interruption.

BRIEF DESCRIPTION OF THE DRAWINGS

The properties, features and advantages of this invention that are described and the way in which they are achieved become clearer and more distinctly comprehensible in connection with the following description of the exemplary embodiments, which are explained in more detail in connection with the drawings, in which.

DETAILED DESCRIPTION OF THE EXAMPLE EMBODIMENTS

Figure 1:
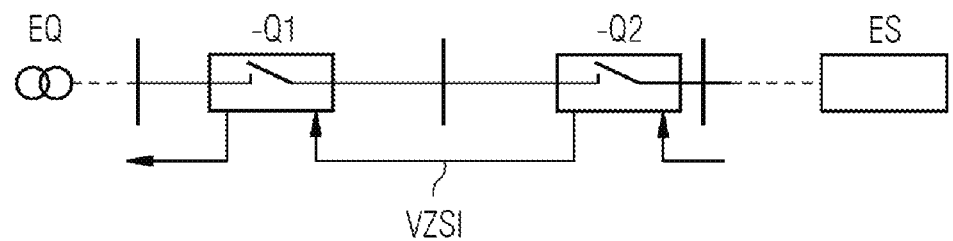
FIG. 1 shows a series circuit comprising two circuit breakers of an embodiment of the invention.

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Various example embodiments will now be described more fully with reference to the accompanying drawings in which only some example embodiments are shown. Specific structural and functional details disclosed herein are merely representative for purposes of describing example embodiments. The present invention, however, may be embodied in many alternate forms and should not be construed as limited to only the example embodiments set forth herein.

Accordingly, while example embodiments of the invention are capable of various modifications and alternative forms, embodiments thereof are shown by way of example in the drawings and will herein be described in detail. It should be understood, however, that there is no intent to limit example embodiments of the present invention to the particular forms disclosed. On the contrary, example embodiments are to cover all modifications, equivalents, and alternatives falling within the scope of the invention. Like numbers refer to like elements throughout the description of the figures.

Before discussing example embodiments in more detail, it is noted that some example embodiments are described as processes or methods depicted as flowcharts. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Specific structural and functional details disclosed herein are merely representative for purposes of describing example embodiments of the present invention. This invention may, however, be embodied in many alternate forms and should not be construed as limited to only the embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments of the present invention. As used herein, the term "and/or," includes any and all combinations of one or more of the associated listed items. The phrase "at least one of" has the same meaning as "and/or".

Further, although the terms first, second, etc. may be used herein to describe various elements, components, regions, layers and/or sections, it should be understood that these elements, components, regions, layers and/or sections should not be limited by these terms. These terms are used only to distinguish one element, component, region, layer, or section from another region, layer, or section. Thus, a first element, component, region, layer, or section discussed below could be termed a second element, component, region, layer, or section without departing from the teachings of the present invention.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements. In contrast, when an element is referred to as being "directly" connected, engaged, interfaced, or coupled to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments of the invention. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Spatially relative terms, such as "beneath", "below", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, term such as "below" can encompass both an orientation of above and below. The device may be otherwise oriented (rotated 90 degrees or at other orientations) and the spatially relative descriptors used herein are interpreted accordingly.

Portions of the example embodiments and corresponding detailed description may be presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device/ hardware, that manipulates and transforms data represented as physical, electronic quantities within the computer system's registers and memories into other data similarly represented as physical quantities within the computer system memories or registers or other such information storage, transmission or display devices.

At least one embodiment of the invention is directed to a circuit breaker for an electrical circuit, comprising:
 a tripping unit, to interrupt the electrical circuit;
 at least one current sensor, to ascertain the electric current I flowing through the circuit breaker;
 an input for a ZSI signal, at which a blocking signal for a circuit breaker arranged upstream on the energy sink side can be received, all of which are connected to a control unit and are embodied such that a connectable blocking function ZSI is provided, wherein the ascertained current I
a) is compared with a first current limit value Ii, the exceeding of which requires this first current value to be present for a first period of time t1 in order to prompt interruption of the electrical circuit,
b) is compared with a second current limit value Isd, which is below the first current limit value Ii—i.e. smaller, when the blocking function ZSI is disengaged, this second current limit value Isd needs to be present for a second period of time t2, which exceeds the first period of time, in order to prompt interruption,
when the blocking function ZSI is engaged and the blocking signal is absent, this second current limit value Isd needs to be present for a third period of time t3 in order to prompt interruption,
when the blocking function ZSI is engaged and the blocking signal is there, this second current limit value Isd needs to be present for a fourth period of time t4, which exceeds the third period of time, in order to prompt interruption,
wherein when the blocking function is engaged and the blocking signal is there, exceeding of the first current limit value Ii requires said first current limit value to be present for a fifth period of time t5, which exceeds the first period of time, in order to prompt interruption.

Furthermore, an output for a ZSI signal may be provided in order to send a blocking signal in the direction of a circuit breaker provided on the energy source side.

This has the particular advantage that, particularly in the case of instantaneous protection, i.e. when the first, high, current limit value is reached, particularly for immediate interruption, blocking of the interruption for a fifth period of time t5 is achieved. Hence, even in the case of very high currents, selectivity is achieved, i.e. the circuit breaker closest to the fault can interrupt the electrical circuit.

Advantageous embodiments of the invention are specified in the subclaims.

In one advantageous embodiment of the invention, the second period of time t2 is greater than or equal to the first period of time t1. This has the particular advantage that overloading of the circuit breaker is avoided.

In one advantageous embodiment of the invention, the third period of time t3 is equal to the second period of time t2. This has the particular advantage that a particularly simple implementation with just one timer is possible, said timer being able to be used for both modes of operation.

In one advantageous embodiment of the invention, the third period of time t3 is greater than the first period of time t1. This has the particular advantage that overloading of the circuit breaker is similarly avoided.

In one advantageous embodiment of the invention, the second current limit value Isd and/or the second period of time t2 are embodied to be adjustable on the circuit breaker. This has the particular advantage that individual adjustment of the operating parameters of the circuit breaker by operating personnel is possible.

In one advantageous embodiment of the invention, the ascertained current I
c) is compared with a third current limit value Ilt, which is below the second current limit value Isd and the exceeding of which requires said third current limit value to be present for a sixth period of time t6 in order to prompt interruption. This has the particular advantage that disconnection takes place only under overcurrent conditions that exceed time limits, for example on the basis of a current/period of time characteristic, i.e. a maximum supply of power is ensured, disconnection not taking place in the event of very short-term overcurrents.

In one advantageous embodiment of the invention, the sixth period of time t6 is greater than the second or third period of time t3. This has the particular advantage that overloading of the circuit breaker is avoided.

In one advantageous embodiment of the invention, the sixth period of time t6 is greater than the fifth or fourth period of time. This has the particular advantage that overloading of the circuit breaker is avoided.

In one advantageous embodiment of the invention, the circuit breaker is an open or air circuit breaker. This has the particular advantage that in this case the invention renders use thereof in selective power distribution networks particularly universal and extends the field of use by the feature according to an embodiment of the invention.

In one advantageous embodiment of the invention, the circuit breaker is a compact circuit breaker or molded case circuit breaker. This has the particular advantage that in this case the invention renders use thereof in selective power distribution networks particularly universal and extends the field of use by the feature according to an embodiment of the invention.

All embodiments of the invention bring about an improvement in a circuit breaker.

FIG. 1 shows an energy source EQ, such as a current source or feed point in a low-voltage network. Said energy source is connected to a first circuit breaker Q1 on the energy sink side. Said circuit breaker is in turn connected to a second circuit breaker Q2, to which an energy sink ES, such as an electrical consumer or a load, is connected. The first circuit breaker Q1 may have further circuit breakers, analogous to the second circuit breaker Q2, connected to it on the energy sink side, which are in turn connected to further energy sinks or consumers.

The second circuit breaker Q2, which is closest to the energy sink ES, is connected to the first circuit breaker Q1 via a communication link VZSI. For multiple circuit breakers connected in series, this applies analogously.

In order to achieve disconnection by the circuit breaker situated closest to the fault, what is known as zone selective interlocking, also referred to as ZSI, is provided for the "short-term-delayed tripping", that is to say for current values that exceed a second current limit value Isd.

To this end, the second circuit breaker Q2 uses the communication link VZSI to send a signal, also referred to as a ZSI signal, to its circuit breaker that is superordinate or arranged upstream in the energy source direction, in the example the first circuit breaker Q1, when the second circuit breaker Q2 identifies a trip condition, for example in the event of an overcurrent or short circuit. When the blocking function is activated and such a signal or blocking signal is received in the first (superordinate) circuit breaker Q1, the latter then blocks its tripping or interruption of the electrical circuit for a maximum predetermined time, for example for the fourth period of time t4, which may also vary on the basis of the level of the fault current. Hence, the circuit breaker Q2 that is arranged upstream in the energy sink direction can interrupt the circuit, i.e. the circuit breaker arranged closest to the fault, without additional interruption by the circuit breaker Q1 that is superordinate in the energy source direction taking place, since this circuit breaker delays its tripping.

If the circuit breaker that is situated closest to the fault cannot interrupt the circuit, then the superordinate circuit breaker can interrupt the circuit as a precaution after the blocking time or fourth period of time t4 has elapsed.

In the event of a blocking signal not being there and the blocking function ZSI being engaged, interruption/disconnection when a second current limit value is there takes place after a third period of time t3.

In the event of the blocking function ZSI being disengaged, interruption/disconnection when the second current limit value is there takes place after a second period of time t2.

The second and third periods of time may, but do not have to, be identical or in the same time frame.

When the first current limit value Ii is reached, which is usually greater than the second current limit value Isd, instantaneous interruption takes place with a short period of time t1, which in most cases is prescribed by the minimum disconnection time of the circuit breaker, in order to protect the circuit breaker.

ZSI signals of this kind allow staggering and cascading with regard to minimal power failure, i.e. only disconnection of the circuit that is actually afflicted with a fault.

Figure 2:
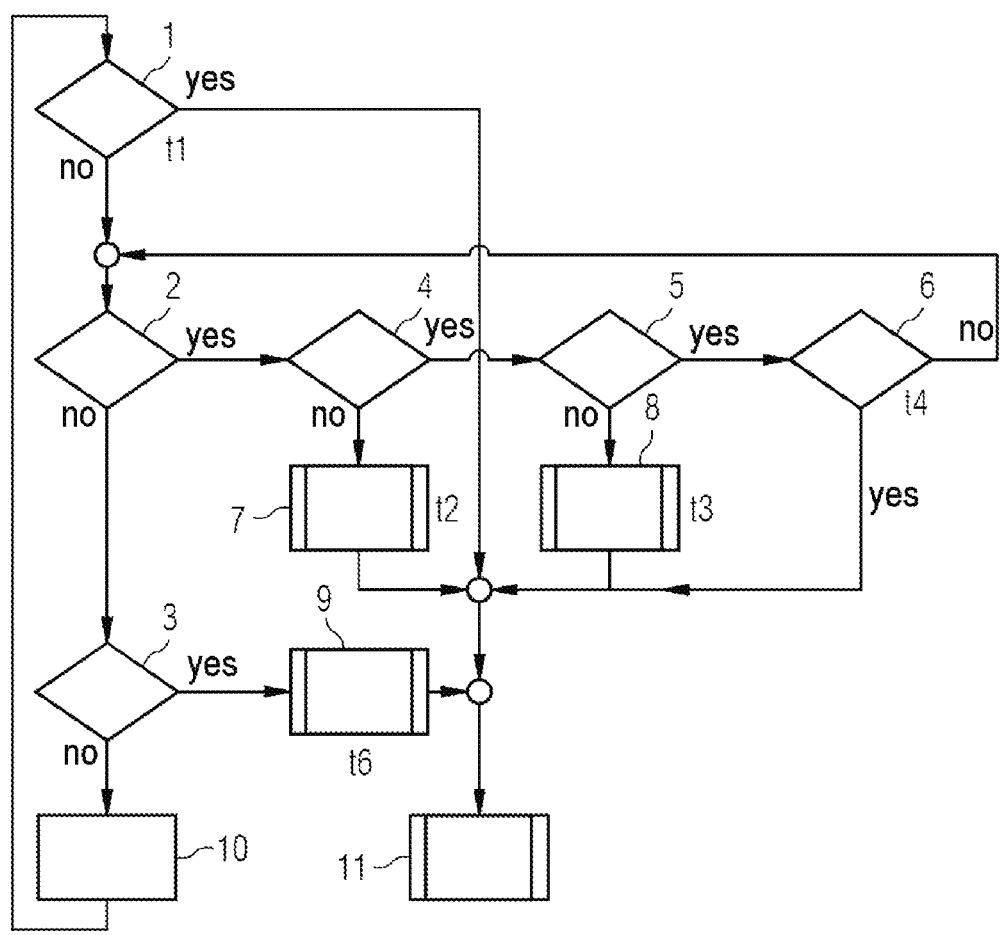
FIG. 2 shows a first flowchart for a circuit breaker.

FIG. 2 shows a first flowchart for a circuit breaker. In a first step 1, the ascertained current I is compared with the first current limit value Ii.

If the ascertained current I is greater than the first current limit value Ii, I>Ii?, "yes" case, then the electrical circuit is interrupted in step 11.

If the ascertained current I is less than the first current limit value Ii, "no" case, then in step 2 the ascertained current I is compared with the second current limit value Isd, for a short-term-delayed interruption, I>Isd?

If the ascertained current I is less than the second current limit value Isd, "no" case, then in step 3 the ascertained current I is compared with the third current limit value Ilt, for a long-term-delayed interruption, I>Ilt?

If the ascertained current I is less than the third current limit value Ilt, "no" case, then the algorithm can start over again with step 1 or, in step 10, further protection criteria can be checked before starting again with step 1.

If the ascertained current I is greater than the third current limit value Ilt in step 3, "yes" case, then in step 9 a long-term-delayed interruption, for example, takes place when the third current limit value Ilt is exceeded for a sixth period of time t6. The electrical circuit is then interrupted in step 11.

If the ascertained current I is greater than the second current limit value Isd in step 2, "yes" case, then in step 4 a check is performed to determine whether the connectable blocking function ZSI is engaged.

If the blocking function ZSI is disengaged, "no" case, then in step 7 a check is performed to determine whether the second current limit value Isd is present for a second period of time, and, if so, the electrical circuit is interrupted in step 11.

If the blocking function ZSI is engaged, "yes" case, then in step 5 a check is performed to determine whether a blocking signal is received or there from a circuit breaker situated in the energy sink direction, for example via the communication link VZSI.

If no blocking signal is there, "no" case, then in step 8 a check is performed to determine whether the second current limit value Isd is exceeded for a third period of time t3, and, if so, the electrical circuit is interrupted in step 11.

If a blocking signal is there from a circuit breaker that is arranged upstream in the energy sink direction, for example Q2, "yes" case, then in step 6 a check is performed to determine whether the second current limit value Isd is still exceeded after a fourth period of time t4, and, if "yes", interruption takes place in step 11, if no, i.e. the circuit breaker that is arranged upstream and situated closest to the fault has interrupted the circuit, then the procedure is terminated and can begin over in step 1, or between step 1 and step 2, as shown in the drawing.

In this case, the fourth period of time t4 is usually a long or relatively long period of time, so that the circuit breaker that is arranged upstream and situated close to the fault has sufficient time to interrupt the circuit for this current intensity.

Figure 3:
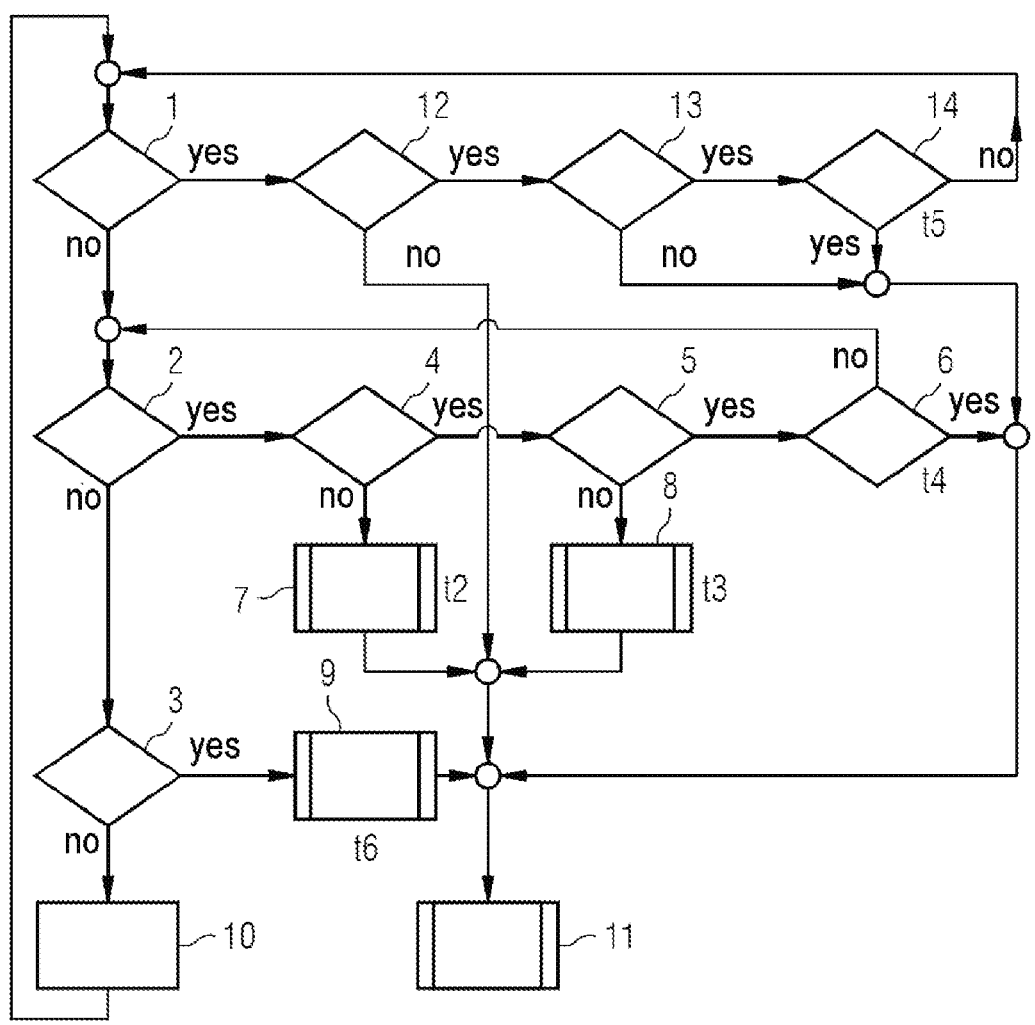
FIG. 3 shows a second flowchart for a circuit breaker.

FIG. 3 shows a second flowchart for a circuit breaker as shown in FIG. 2, with the difference that further steps 12, 13 and 14 are provided according to an embodiment of the invention.

In the first step 1, the ascertained current I is compared with the first current limit value Ii.

If the ascertained current I is greater than the first current limit value Ii, I>Ii?, "yes" case, then in step 12 a check is performed to determine whether the blocking function ZSI is engaged.

If the blocking function ZSI is disengaged, "no" case, then in step 11 the electrical circuit is interrupted immediately for the case of the first period of time t1.

If the blocking function ZSI is engaged, "yes" case, then in step 13 a check is performed to determine whether a blocking signal from a circuit breaker that is arranged upstream, situated in the energy sink direction, for example circuit breaker Q2, is present or is received or is there, for example via the communication link VZSI.

If no blocking signal is there, "no" case, then in step 11 the electrical circuit is interrupted.

If the blocking signal from a circuit breaker arranged upstream in the energy sink direction, for example Q2, is there, "yes" case, then in step 14 the interruption is blocked for a fifth period of time t5. If, after the fifth period of time t5, the ascertained current I is still greater than the first current limit value Ii, "yes" case, then the electrical circuit is interrupted in step 11. Otherwise, the circuit breaker arranged upstream has interrupted the electrical circuit and the procedure begins over in step 1, "no" case.

In this case, the method described can be regarded as purely exemplary and may naturally differ in the detail without departing from the scope of protection. The principle should be clear.

The fifth period of time t5 is a long or relatively long period of time in this case, so that the circuit breaker arranged upstream and situated close to the fault has sufficient time to interrupt the circuit for this fault current. The fifth period of time t5 may be shorter than the fourth period of time t4 in this case. For higher fault currents, the loading on the circuit breaker is higher.

Although the invention has been illustrated and described in more detail by means of the exemplary embodiment, the invention is not restricted by the disclosed examples and other variations can be derived therefrom by a person skilled in the art without departing from the scope of protection of the invention.

The aforementioned description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

The patent claims filed with the application are formulation proposals without prejudice for obtaining more extensive patent protection. The applicant reserves the right to claim even further combinations of features previously disclosed only in the description and/or drawings.

The example embodiment or each example embodiment should not be understood as a restriction of the invention. Rather, numerous variations and modifications are possible in the context of the present disclosure, in particular those variants and combinations which can be inferred by the person skilled in the art with regard to achieving the object for example by combination or modification of individual features or elements or method steps that are described in connection with the general or specific part of the description and are contained in the claims and/or the drawings, and, by way of combinable features, lead to a new subject matter or to new method steps or sequences of method steps, including insofar as they concern production, testing and operating methods. Further, elements and/or features of different example embodiments may be combined with each other and/or substituted for each other within the scope of this disclosure and appended claims.

References back that are used in dependent claims indicate the further embodiment of the subject matter of the main claim by way of the features of the respective dependent claim; they should not be understood as dispensing with obtaining independent protection of the subject matter for the combinations of features in the referred-back dependent claims. Furthermore, with regard to interpreting the claims, where a feature is concretized in more specific detail in a subordinate claim, it should be assumed that such a restriction is not present in the respective preceding claims.

Since the subject matter of the dependent claims in relation to the prior art on the priority date may form separate and independent inventions, the applicant reserves the right to make them the subject matter of independent claims or divisional declarations. They may furthermore also contain independent inventions which have a configuration that is independent of the subject matters of the preceding dependent claims.

Still further, any one of the above-described and other example features of the present invention may be embodied in the form of an apparatus, method, system, etc. For example, of the aforementioned methods may be embodied in the form of a system or device, including, but not limited to, any of the structure for performing the methodology illustrated in the drawings.

In this application, including the definitions below, the term 'module' or the term 'controller' may be replaced with the term 'circuit.' The term 'module' may refer to, be part of, or include processor hardware (shared, dedicated, or group) that executes code and memory hardware (shared, dedicated, or group) that stores code executed by the processor hardware.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

None of the elements recited in the claims are intended to be a means-plus-function element within the meaning of 35 U.S.C. § 112(f) unless an element is expressly recited using the phrase "means for" or, in the case of a method claim, using the phrases "operation for" or "step for."

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A circuit breaker for an electrical circuit, comprising:
   a tripping unit, to interrupt the electrical circuit;
   at least one current sensor, to ascertain electric current flowing through the circuit breaker;
   an input for a signal, at which a blocking signal for a circuit breaker arranged upstream on an energy sink side is receivable, each of the tripping unit, at least one current sensor and input being connected to a control unit and are embodied to provide a connectable blocking function, the ascertained electric current being
   comparable with a first current limit value, exceeding of the first current limit value requiring the first current limit value to be present for a first period of time to prompt interruption of the electrical circuit,
   comparable with a second current limit value, relatively below the first current limit value, wherein
   when the blocking function is disengaged, the second current limit value needs to be present for a second period of time to prompt interruption,
   when the blocking function is engaged and the blocking signal is absent, the second current limit value needs to be present for a third period of time to prompt interruption,
   when the blocking function is engaged and the blocking signal is there, the second current limit value needs to be present for a fourth period of time, relatively exceeding the third period of time, to prompt interruption, and wherein when the blocking function is engaged and the blocking signal is there, exceeding of the first current limit value requires said first current limit value to be present for a fifth period of time, relatively exceeding the first period of time, to prompt interruption.

2. The circuit breaker of claim 1, wherein the second period of time is relatively greater than or equal to the first period of time.

3. The circuit breaker of claim 1, wherein the third period of time is equal to the second period of time.

4. The circuit breaker of claim 1, wherein the third period of time is relatively greater than the first period of time.

5. The circuit breaker of claim 1, wherein at least one of the second current limit value and the second period of time are embodied to be adjustable on the circuit breaker.

6. The circuit breaker of claim 1, wherein the ascertained current is compared with a third current limit value, relatively below the second current limit value, the exceeding of which requires said third current limit value to be present for a sixth period of time to prompt interruption.

7. The circuit breaker of claim 6, wherein the sixth period of time is relatively greater than the second or third period of time.

8. The circuit breaker of claim 6, wherein the sixth period of time is relatively greater than the fifth or fourth period of time.

9. The circuit breaker of claim 1, wherein the circuit breaker is an open or air circuit breaker.

10. The circuit breaker of claim 1, wherein the circuit breaker is a compact circuit breaker or molded case circuit breaker.

11. The circuit breaker of claim 2, wherein the circuit breaker is an open or air circuit breaker.

12. The circuit breaker of claim 2, wherein the circuit breaker is a compact circuit breaker or molded case circuit breaker.

13. The circuit breaker of claim 6, wherein the circuit breaker is an open or air circuit breaker.

14. The circuit breaker of claim 6, wherein the circuit breaker is a compact circuit breaker or molded case circuit breaker.

15. The circuit breaker of claim 2, wherein the third period of time is equal to the second period of time.

16. The circuit breaker of claim 2, wherein the third period of time is relatively greater than the first period of time.

17. The circuit breaker of claim 3, wherein the third period of time is relatively greater than the first period of time.

* * * * *